United States Patent
Han et al.

(10) Patent No.: US 10,554,240 B2
(45) Date of Patent: Feb. 4, 2020

(54) WIRELESS ELECTRONIC DEVICE WITH RADIO-FREQUENCY SENSORS

(71) Applicant: Apple Inc., Cupertino, CA (US)

(72) Inventors: Liang Han, Sunnyvale, CA (US); Matthew A. Mow, Los Altos, CA (US)

(73) Assignee: Apple, Inc., Cupertino, CA (US)

( * ) Notice: Subject to any disclaimer, the term of this patent is extended or adjusted under 35 U.S.C. 154(b) by 738 days.

(21) Appl. No.: 14/980,603

(22) Filed: Dec. 28, 2015

(65) Prior Publication Data

US 2017/0187412 A1    Jun. 29, 2017

(51) Int. Cl.
*H04B 1/40*    (2015.01)
*H04B 17/10*    (2015.01)
*H04B 1/44*    (2006.01)

(52) U.S. Cl.
CPC ............ *H04B 1/40* (2013.01); *H04B 1/44* (2013.01); *H04B 17/102* (2015.01)

(58) Field of Classification Search
CPC ......... H04B 5/0043; H01Q 5/378; H01Q 9/04
USPC ............................................. 455/87, 575.7
See application file for complete search history.

(56) References Cited

U.S. PATENT DOCUMENTS

| | | | |
|---|---|---|---|
| 7,260,424 B2 | 8/2007 | Schmidt | |
| 8,280,323 B2 | 10/2012 | Thompson | |
| 9,203,138 B2 | 12/2015 | Bavisi et al. | |
| 9,203,463 B2 | 12/2015 | Asrani et al. | |
| 9,444,425 B2 | 9/2016 | Mow et al. | |
| 9,525,761 B1 * | 12/2016 | Chang | H04B 1/3838 |
| 9,608,331 B1 * | 3/2017 | Rowson | H01Q 9/16 |
| 2004/0214605 A1 | 10/2004 | Zhang et al. | |
| 2011/0250928 A1 | 10/2011 | Schlub et al. | |
| 2012/0302282 A1 | 11/2012 | Pascolini | |
| 2013/0040671 A1 * | 2/2013 | Zawaideh | H04W 88/06 455/500 |

(Continued)

FOREIGN PATENT DOCUMENTS

| | | |
|---|---|---|
| CN | 103339796 A | 10/2013 |
| EP | 1622262 | 2/2008 |

(Continued)

OTHER PUBLICATIONS

Mow et al., U.S. Appl. No. 14/980,574, filed Dec. 28, 2015.

*Primary Examiner* — Ankur Jain
(74) *Attorney, Agent, or Firm* — Treyz Law Group, P.C.; G. Victor Treyz; Tianyi He

(57) ABSTRACT

An electronic device may be provided with wireless circuitry. The wireless circuitry may include one or more antennas. The electronic device may have a housing in which control circuitry and radio-frequency transceiver circuitry is mounted. The transceiver circuitry may be used to transmit and receive radio-frequency signals using the antennas. The electronic device may have radio-frequency sensors. The radio-frequency sensors may include current sensors, voltage sensors, power sensors, sensors with taps and switching circuitry that tap signals flowing in a signal path and that may make measurements such as impedance measurements, and radio-frequency sensors with sensor antennas and associated sensor circuits that measure radio-frequency signals received using the sensor antennas. The control circuitry may make wireless circuit adjustments based on measured radio-frequency signals.

10 Claims, 11 Drawing Sheets

(56) References Cited

U.S. PATENT DOCUMENTS

| | | | |
|---|---|---|---|
| 2013/0273870 A1* | 10/2013 | Shi | H01Q 1/243 |
| | | | 455/269 |
| 2013/0328723 A1 | 12/2013 | Rappaport | |
| 2014/0071008 A1 | 3/2014 | Desclos et al. | |
| 2014/0315592 A1 | 10/2014 | Schlub et al. | |
| 2014/0319923 A1* | 10/2014 | Lee | H02J 17/00 |
| | | | 307/104 |
| 2015/0084829 A1* | 3/2015 | Jenwatanavet | H01Q 1/243 |
| | | | 343/876 |
| 2015/0119052 A1* | 4/2015 | Caimi | H01Q 5/22 |
| | | | 455/450 |
| 2015/0236546 A1* | 8/2015 | Kesler | H04B 5/0037 |
| | | | 455/573 |
| 2015/0295310 A1 | 10/2015 | Hazelton et al. | |
| 2015/0380812 A1* | 12/2015 | Black | H01Q 1/243 |
| | | | 343/861 |
| 2016/0173172 A1* | 6/2016 | Greene | H04B 7/0404 |
| | | | 455/562.1 |
| 2016/0197651 A1* | 7/2016 | Tsukamoto | H04W 4/026 |
| | | | 455/41.1 |

FOREIGN PATENT DOCUMENTS

| | | |
|---|---|---|
| KR | 10-2013-0010120 A | 1/2013 |
| KR | 10-2015-0139921 A | 12/2015 |

\* cited by examiner

| SENSOR OUTPUT RATIO (FRONT/REAR) | CONDITION |
|---|---|
| R1 | DEVICE ON TABLE |
| R2 | DEVICE AT HEAD |
| R3 | DEVICE IN HAND |
| R4 | DEVICE IN FREE SPACE |

*FIG. 14*

WIRELESS ELECTRONIC DEVICE WITH RADIO-FREQUENCY SENSORS

BACKGROUND

This relates generally to electronic devices and, more particularly, to electronic devices with wireless communications circuitry.

Electronic devices often include wireless communications circuitry. For example, cellular telephones, computers, and other devices often contain antennas and wireless transceivers for supporting wireless communications.

It can be challenging to form electronic device antenna structures with desired attributes. In some wireless devices, antennas are bulky. In other devices, antennas are compact, but are sensitive to the position of the antennas relative to external objects. If care is not taken, antennas may become detuned, may emit wireless signals with a power that is more or less than desired, or may otherwise not perform as expected.

It would therefore be desirable to be able to provide improved wireless circuitry for electronic devices.

SUMMARY

An electronic device may be provided with wireless circuitry. The wireless circuitry may include one or more antennas and radio-frequency transceiver circuitry. The electronic device may have a housing in which control circuitry and the radio-frequency transceiver circuitry and other wireless circuitry is mounted. The transceiver circuitry may be used to transmit and receive radio-frequency signals using the antennas.

The electronic device may have radio-frequency sensors that measure radio-frequency signals associated with the operation of the antennas. The radio-frequency sensors may include current sensors, voltage sensors, power sensors, sensors with taps and switching circuitry that tap signals flowing in a signal path in an antenna or other portion of the wireless circuitry in the electronic device to make impedance measurements and other measurements, and may include radio-frequency sensors with sensor antennas and associated sensor circuits that measure radio-frequency signals received using the sensor antennas.

The antennas may include inverted-F antennas with resonating element arms, grounds, and feeds and return paths coupled between the resonating element arms and grounds. The radio-frequency sensors may make measurements on signals flowing in the return paths and other portions of the antennas, may make measurements of signals flowing in parasitic antenna resonating elements within antennas, and may make radio-frequency signal measurements on wirelessly received radio-frequency signals produced during antenna operation.

The radio-frequency sensors may be located throughout the electronic device to allow the control circuitry to accurately assess wireless performance during antenna operation. The control circuitry may make antenna adjustments, may switch antennas into and out of use, may adjust a phased antenna array to perform beam steering operations, may adjust a maximum transmit power level with which the transceiver circuitry transmits radio-frequency signals through the antenna, and may make other adjustments to the wireless circuitry in the electronic device based on radio-frequency sensor signals such as signals measured with the radio-frequency sensors.

BRIEF DESCRIPTION OF THE DRAWINGS

FIG. 14 is a table in which the information associated with multiple radio-frequency sensors such as a sensor pair output ratio has been associated with different wireless operating conditions for an electronic device in accordance with an embodiment.

DETAILED DESCRIPTION

Figure 1:
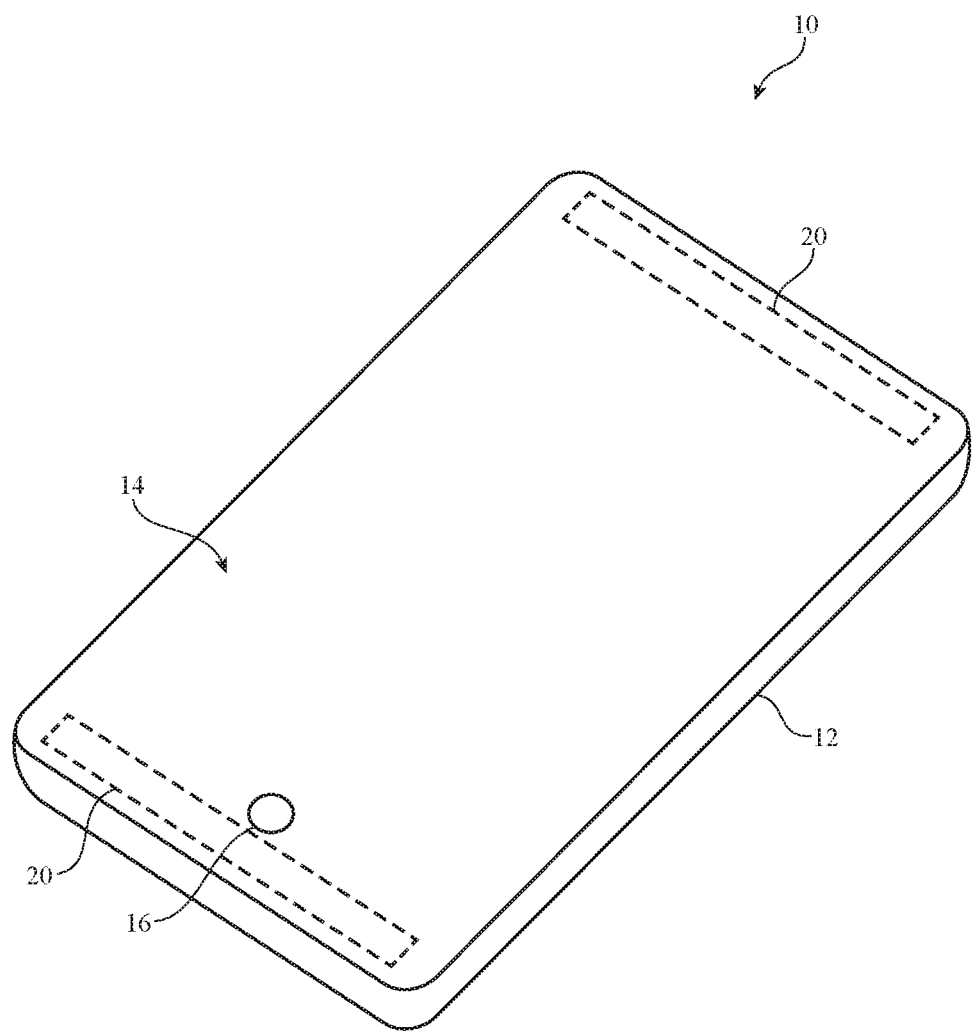
FIG. 1 is a perspective view of an illustrative electronic device with wireless communications circuitry in accordance with an embodiment.

An electronic device such as electronic device 10 of FIG. 1 may contain wireless circuitry. The wireless circuitry may include one or more antennas. Sensors may be incorporated into the electronic device. The sensors may be radio-frequency signal sensors that measure radio-frequency antenna signals. Information from the sensors may be correlated with near-field and far-field radiation patterns and wireless power levels and may be used in monitoring the operating environment of a wireless device. Information from the sensors may be used in adjusting tunable circuits for antennas, may be used in determining which antennas to switch in and out of use, may be used in performing beam steering operations and other operations with phased antenna arrays, may be used in adjusting a maximum transmit power for a wireless transmitter, and may otherwise be used in operating the wireless circuitry of electronic device 10.

The wireless circuitry of device 10 may include a Global Position System (GPS) receiver that handles GPS satellite navigation system signals at 1575 MHz or a GLONASS receiver that handles GLONASS signals at 1609 MHz. Device 10 may also contain wireless communications circuitry that operates in communications bands such as cellular telephone bands and wireless circuitry that operates in communications bands such as the 2.4 GHz Bluetooth® band and the 2.4 GHz and 5 GHz WiFi® wireless local area network bands (sometimes referred to as IEEE 802.11 bands or wireless local area network communications bands). If desired, device 10 may also contain wireless communications circuitry for implementing near-field communications, light-based wireless communications, or other wireless communications (e.g., millimeter wave communications at 60 GHz or other extremely high frequencies, etc.).

Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. In the illustrative configuration of FIG. 1, device 10 is a portable device such as a cellular telephone, media player, tablet computer, or other portable computing device. Other configurations may be used for device 10 if desired. The example of FIG. 1 is merely illustrative.

In the example of FIG. 1, device 10 includes a display such as display 14. Display 14 has been mounted in a housing such as housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may include an array of display pixels formed from liquid crystal display (LCD) components, an array of electrophoretic display pixels, an array of plasma display pixels, an array of organic light-emitting diode display pixels, an array of electrowetting display pixels, or display pixels based on other display technologies.

Display 14 may be protected using a display cover layer such as a layer of transparent glass or clear plastic. Openings may be formed in the display cover layer. For example, an opening may be formed in the display cover layer to accommodate a button such as button 16. An opening may also be formed in the display cover layer to accommodate ports such as a speaker port. Openings may be formed in housing 12 to form communications ports (e.g., an audio jack port, a digital data port, etc.). Openings in housing 12 may also be formed for audio components such as a speaker and/or a microphone.

Antennas may be mounted in housing 12. For example, housing 12 may have four peripheral edges as shown in FIG. 1 and one or more antennas may be located along one or more of these edges. As shown in the illustrative configuration of FIG. 1, antennas may, if desired, be mounted in regions 20 along opposing peripheral edges of housing 12 (as an example). Antennas may also be mounted in other portions of device 10, if desired. The configuration of FIG. 1 is merely illustrative.

Figure 2:
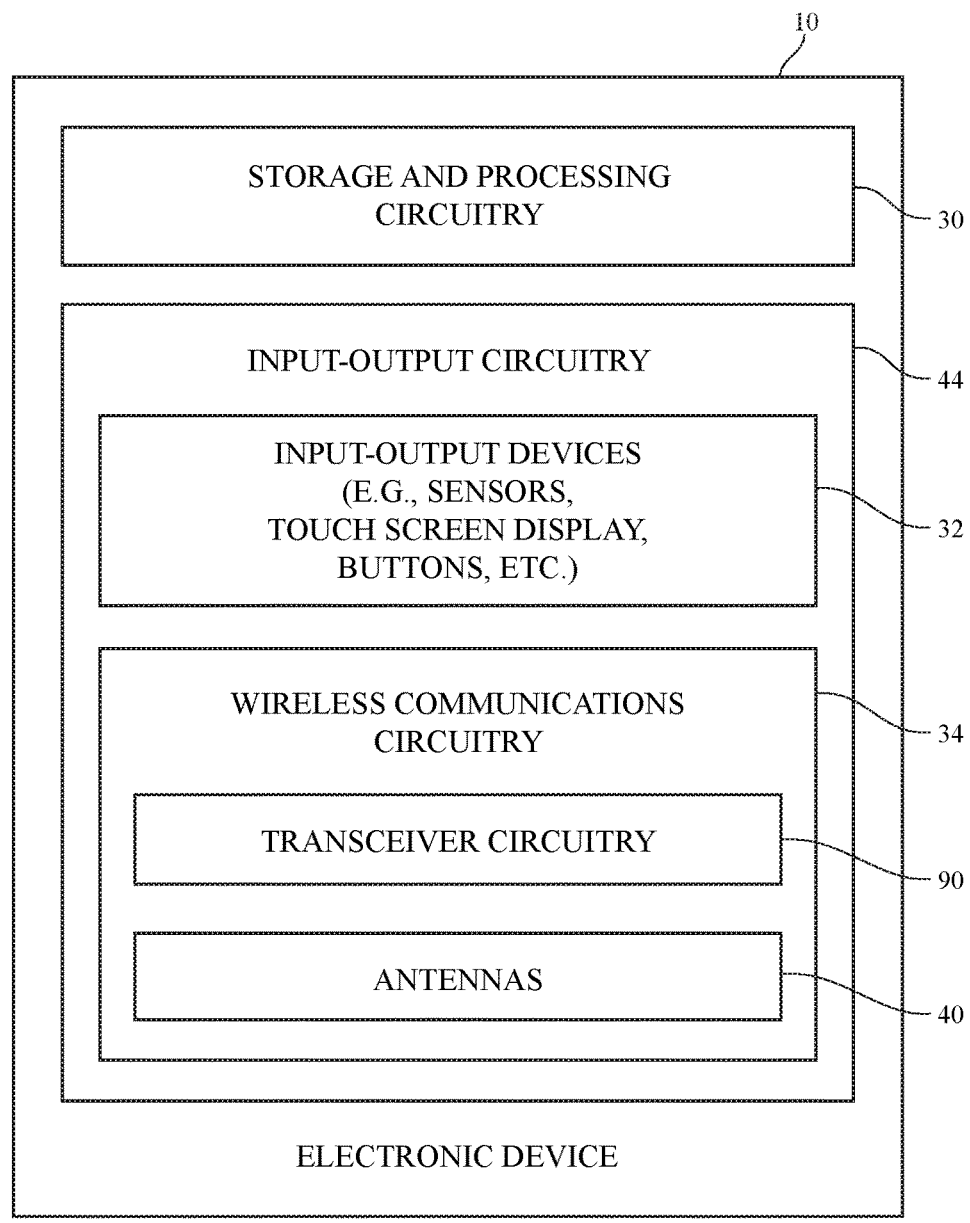
FIG. 2 is a schematic diagram of an illustrative electronic device with wireless communications circuitry in accordance with an embodiment.

A schematic diagram showing illustrative components that may be used in device 10 is shown in FIG. 2. As shown in FIG. 2, device 10 may include control circuitry such as storage and processing circuitry 30. Storage and processing circuitry 30 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 30 may be used to control the operation of device 10. This processing circuitry may be based on one or more microprocessors, microcontrollers, digital signal processors, baseband processor integrated circuits, application specific integrated circuits, etc.

Storage and processing circuitry 30 may be used to run software on device 10, such as internet browsing applications, voice-over-internet-protocol (VOIP) telephone call applications, email applications, media playback applications, operating system functions, etc. To support interactions with external equipment, storage and processing circuitry 30 may be used in implementing communications protocols. Communications protocols that may be implemented using storage and processing circuitry 30 include internet protocols, wireless local area network protocols (e.g., IEEE 802.11 protocols—sometimes referred to as WiFi®), protocols for other short-range wireless communications links such as the Bluetooth® protocol, cellular telephone protocols, MIMO protocols, antenna diversity protocols, satellite navigation system protocols, etc. Circuitry 30 may control a phased antenna array formed from multiple antennas in device 10 (e.g., to implement beam steering functions). If desired, circuitry 30 may be used in tuning antennas, adjusting wireless transmit powers for transceivers in device 10 (e.g., transmit powers may be adjusted up and down in response to transmit power commands from wireless base stations while observing an established overall maximum allowed transmit power), and/or in otherwise controlling the wireless operation of device 10.

Device 10 may include input-output circuitry 44. Input-output circuitry 44 may include input-output devices 32. Input-output devices 32 may be used to allow data to be supplied to device 10 and to allow data to be provided from device 10 to external devices. Input-output devices 32 may include user interface devices, data port devices, and other input-output components. For example, input-output devices may include touch screens, displays without touch sensor capabilities, buttons, joysticks, scrolling wheels, touch pads, key pads, keyboards, microphones, cameras, speakers, status indicators, light sources, audio jacks and other audio port components, digital data port devices, light sensors, accelerometers or other components that can detect motion and device orientation relative to the Earth, capacitance sensors, proximity sensors (e.g., a capacitive proximity sensor and/or an infrared proximity sensor), magnetic sensors, a connector port sensor or other sensor that determines whether device 10 is mounted in a dock, radio-frequency sensors, and other sensors and input-output components.

Input-output circuitry 44 may include wireless communications circuitry 34 for communicating wirelessly with external equipment. Wireless communications circuitry 34 may include radio-frequency (RF) transceiver circuitry formed from one or more integrated circuits, power amplifier circuitry, low-noise input amplifiers, passive RF components, one or more antennas 40, transmission lines, and other circuitry for handling RF wireless signals. Wireless signals can also be sent using light (e.g., using infrared communications).

Wireless communications circuitry 34 may include radio-frequency transceiver circuitry 90 for handling various radio-frequency communications bands. For example, circuitry 90 may include wireless local area network transceiver circuitry that may handle 2.4 GHz and 5 GHz bands for WiFi® (IEEE 802.11) communications and that may handle the 2.4 GHz Bluetooth® communications band, may include cellular telephone transceiver circuitry for handling wireless communications in frequency ranges such as a low communications band from 700 to 960 MHz, a midband from 1710 to 2170 MHz, and a high band from 2300 to 2700 MHz or other communications bands between 700 MHz and 2700 MHz or other suitable frequencies (as examples), and may include circuitry for other short-range and long-range wireless links if desired. If desired, wireless transceiver circuitry 90 may include 60 GHz transceiver circuitry, circuitry for receiving television and radio signals, paging system transceivers, near field communications (NFC) circuitry, etc. Wireless transceiver circuitry 90 may also include satellite navigation system circuitry such as global positioning system (GPS) receiver circuitry for receiving GPS signals at 1575 MHz or for handling other satellite positioning data (e.g., GLONASS signals at 1609 MHz). In WiFi® and Bluetooth® links and other short-range wireless links, wireless signals are typically used to convey data over tens or hundreds of feet. In cellular telephone links and other long-range links, wireless signals are typically used to convey data over thousands of feet or miles.

Antennas 40 in wireless communications circuitry 34 may be formed using any suitable antenna types. For example, antennas 40 may include antennas with resonating elements that are formed from loop antenna structures, patch antenna structures, inverted-F antenna structures, slot antenna structures, planar inverted-F antenna structures, helical antenna structures, hybrids of these designs, etc. If desired, one or more of antennas 40 may be cavity-backed antennas. Different types of antennas may be used for different bands and combinations of bands. For example, one type of antenna may be used in forming a local wireless link antenna and another type of antenna may be used in forming a remote wireless link antenna. Dedicated antennas may be used for transmitting and/or receiving signals in a particular band or, if desired, antennas 40 can be configured to receive signals for multiple communications bands.

Device 10 may contain multiple antennas 40. The antennas may be used together or one of the antennas may be switched into use while the other antenna(s) may be switched out of use. If desired, control circuitry 30 may be used to select an optimum antenna to use in device 10 in real time and/or an optimum setting for tunable wireless circuitry associated with one or more of antennas 40.

Storage and processing circuitry 30, input-output circuitry 44, and other components of device 10 may be mounted in device housing 12.

Figure 3:
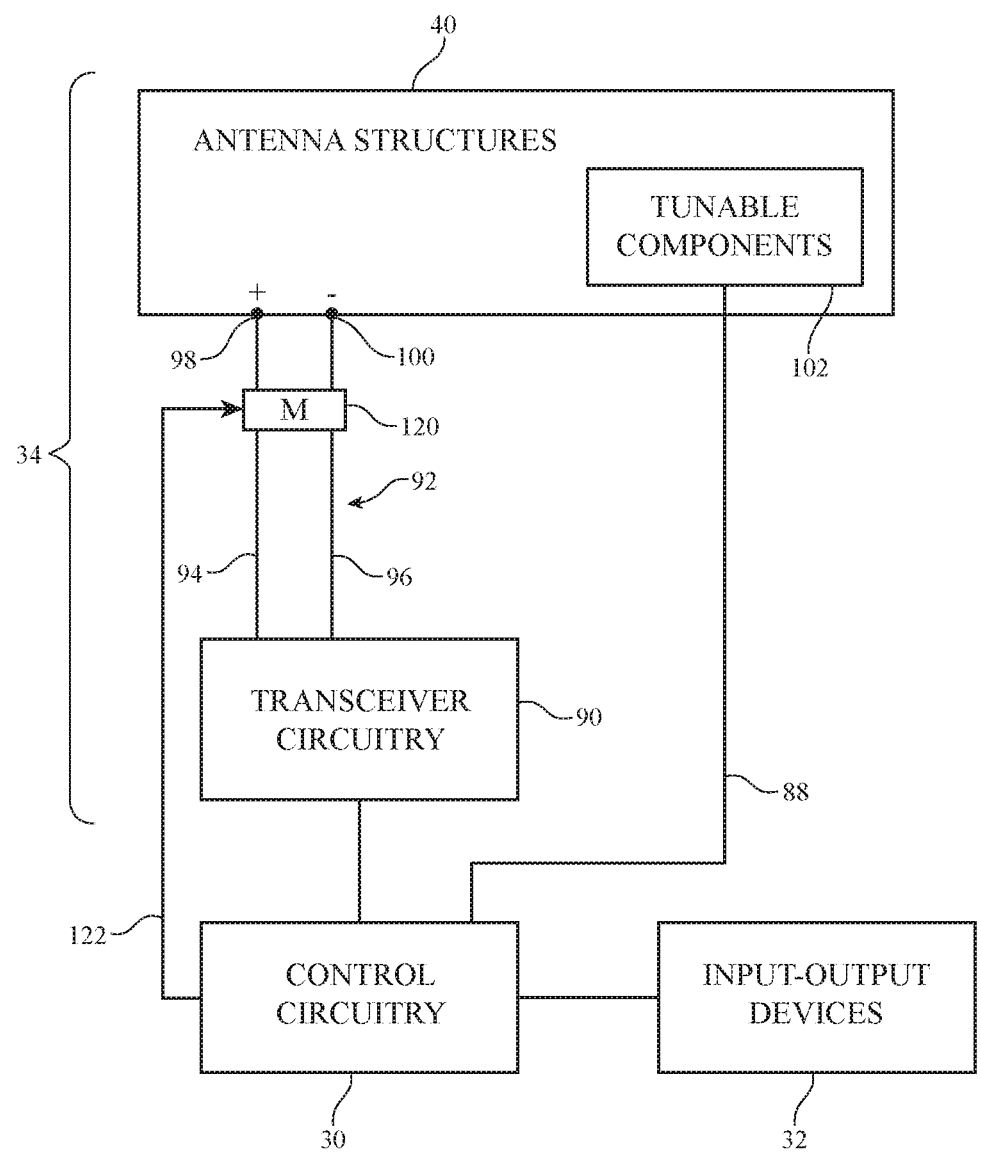
FIG. 3 is a diagram of illustrative wireless circuitry in accordance with an embodiment.

As shown in FIG. 3, transceiver circuitry 90 in wireless circuitry 34 may be coupled to antenna structures 40 using paths such as path 92. Transmission line paths in device 10 such as transmission line 92 may include coaxial cable paths, microstrip transmission lines, stripline transmission lines, edge-coupled microstrip transmission lines, edge-coupled stripline transmission lines, transmission lines formed from combinations of transmission lines of these types, etc. A separate respective transmission line 92 may be used in routing signals between each antenna 40 in device 10 and transceiver circuitry 90 (as an example).

Filter circuitry, switching circuitry, impedance matching circuitry, and other circuitry may be interposed within the transmission lines, if desired (see, e.g., impedance matching and filter circuitry 120).

Wireless circuitry 34 may be coupled to control circuitry 30. Control circuitry 30 may be coupled to input-output devices 32. Input-output devices 32 may supply output from device 10 and may receive input from sources that are external to device 10. Control circuitry 30 may use wireless circuitry 34 to transmit and receive wireless signals.

To provide antenna structures 40 with the ability to cover communications frequencies of interest, antenna structures 40 may be provided with circuitry such as filter circuitry (e.g., one or more passive filters and/or one or more tunable circuits). If desired, antenna structures 40 may be provided with adjustable circuits such as tunable components 102 to tune antennas over communications bands of interest. Tunable components 102 may include tunable inductors, tunable capacitors, or other tunable components. Tunable components such as these may be based on switches and networks of fixed components, distributed metal structures that produce associated distributed capacitances and inductances, variable solid state devices for producing variable capacitance and inductance values, tunable filters, or other suitable tunable structures. During operation of device 10, control circuitry 30 may issue control signals on one or more paths such as path 88 that adjust inductance values, capacitance values, or other parameters associated with tunable components 102, thereby tuning antenna structures 40 to cover desired communications bands. Configurations in which antennas 40 are fixed (not tunable) and configurations in which tunable components 102 are incorporated into circuits such as filter and matching circuits (e.g., circuit 120, which may contain tunable components controlled using signals on path 122), in which tunable components 102 are incorporated into parasitic antenna elements (e.g., parasitics in structures 40), and other arrangements in which wireless circuitry 34 includes adjustable components may also be used.

Path 92 may include one or more transmission lines. As an example, signal path 92 of FIG. 3 may be a transmission line having a positive signal conductor such as line 94 and a ground signal conductor such as line 96. Lines 94 and 96 may form parts of a coaxial cable or a microstrip transmission line (as examples). An impedance matching network (matching circuit) such as matching circuit 120 that is formed from components such as inductors, resistors, and capacitors may be used in matching the impedance of antenna structures 40 to the impedance of transmission line 92 and may, if desired, incorporate a band pass filter, band stop filter, high pass filter, and/or low pass filter. Matching network components may be provided as discrete components (e.g., surface mount technology components) or may be formed from housing structures, printed circuit board structures, traces on plastic supports, etc. Components such as these may also be used in forming filter circuitry in antenna structures 40. As shown in FIG. 3, control circuitry 30 may adjust circuitry such as circuitry 120 (e.g., tunable components in circuitry 120) by issuing control signals on paths such as path 122.

Transmission line 92 may be coupled to antenna feed structures associated with antenna structures 40. As an example, antenna structures 40 may form an inverted-F antenna, a slot antenna, a hybrid inverted-F slot antenna or other antenna having an antenna feed with a positive antenna feed terminal such as terminal 98 and a ground antenna feed terminal such as ground antenna feed terminal 100. Positive transmission line conductor 94 may be coupled to positive antenna feed terminal 98 and ground transmission line conductor 96 may be coupled to ground antenna feed terminal 92. Other types of antenna feed arrangements may be used if desired. The illustrative feeding configuration of FIG. 3 is merely illustrative.

Figure 4:
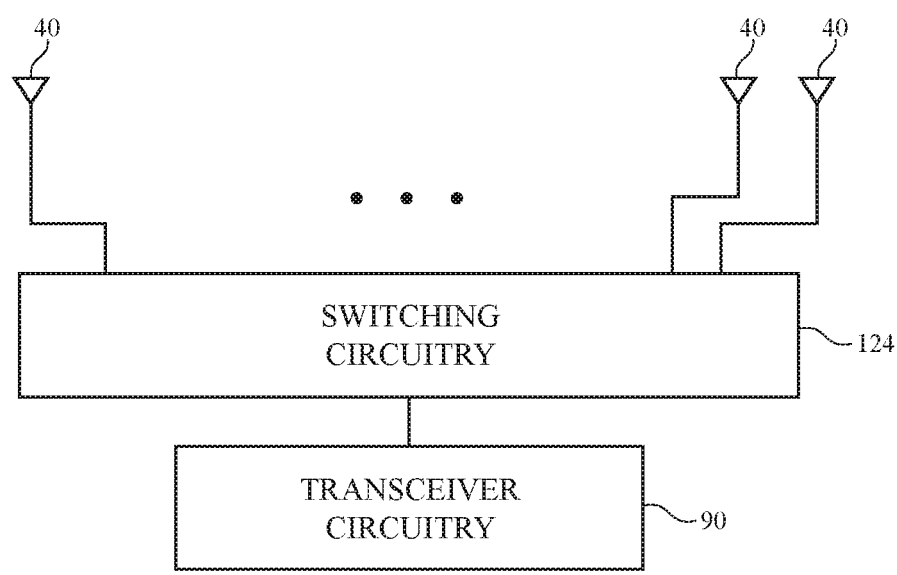
FIG. 4 is a diagram of illustrative wireless circuitry in which switching circuitry is used to switch antennas into and out of use in accordance with an embodiment.

If desired, wireless circuitry 34 may contain multiple antennas 40. The antennas may be located at ends 20 of housing 12 in device 10 and/or in other locations in device 10. As shown in FIG. 4, circuitry such as switching circuitry 124 may be used to switch desired antennas among antennas 40 in and out of use. For example, switching circuitry 124 may couple an antenna 40 that is operating efficiently into use and may temporarily switch an inefficient antenna out of use. As the operating environment for device 10 changes, the efficiency of the inefficient antenna may improve while the efficiency of the efficient antenna may drop. In this scenario or other scenarios in which the desirability of using different antennas changes, switching circuitry 124 may be used to swap antenna assignments so that the most efficient antenna currently available or other desirable antenna is switched into use. In scenarios in which there are multiple active antennas, switching circuitry 124 may be used to select which antennas are active and which antennas are inactive.

Figure 5:
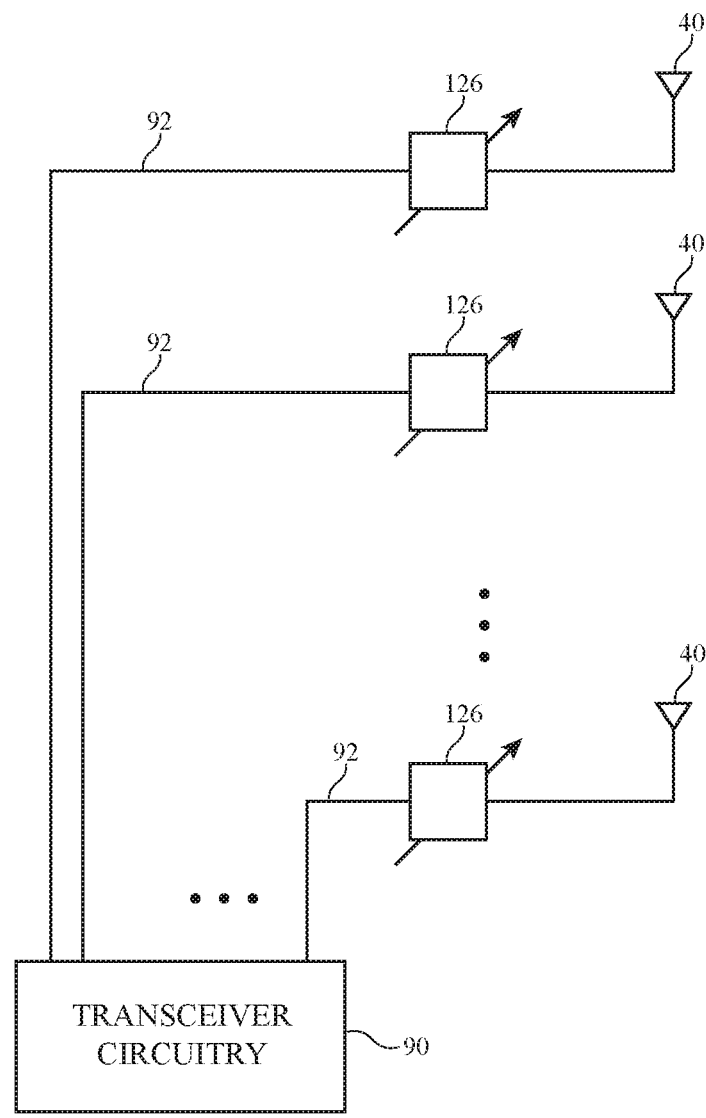
FIG. 5 is a diagram of illustrative wireless circuitry in which adjustable circuits are used to adjust the performance of a phased antenna array in accordance with an embodiment.

FIG. 5 shows how antennas 40 may form part of a phased antenna array. Transmission line paths 92 may couple radio-frequency transceiver circuitry 90 to the antennas of the phased antenna array. Each path 92 may contain adjustable circuitry 126 such as an adjustable phase shifter and an adjustable amplifier or other circuitry to adjust signal amplitude. Using adjustable circuits 126 to adjust the phase and magnitude of the signals conveyed on paths 92, antennas 40 may form a phased antenna array that is used for beam steering, null placement, and other phased antenna array functions.

The wireless performance of device 10 may be affected by the operating environment of device 10. For example, the antennas in device 10 may be affected when operated adjacent to external objects such as parts of the body of a user (e.g., the user's hand, head, etc.), inanimate objects such as tables and chairs, conductive structures such as metal structures in furniture or other structures, dielectric structures, and/or other objects surrounding device 10. The performance of antennas 40 may also be affected by the orientation of device 10 (e.g., the orientation of antennas 40 relative to remote wireless equipment and/or structures in the environment of device 10).

With one suitable arrangement, control circuitry 30 of device 10 may use information from sensors in device 10 in controlling the operation of wireless circuitry 34. This information may include information from audio sensors, accelerometers (which may supply motion data and/or orientation data), temperature sensors, magnetic sensors, force sensors, etc. Device 10 may also include radio-frequency sensors. Radio-frequency sensors in device 10 may be used to measure radio-frequency signals associated with the operation of antenna structures 40 in device 10. The radio-frequency sensors may include sensors that measure signals flowing in antennas and associated circuits in device 10 (e.g., matching circuit signals, transmission line signals, etc.) and/or may include sensors that measure radio-frequency radiation (e.g., emitted wireless signals from antennas in device 10). Radio-frequency sensors may make radio-frequency signal measurements during the transmission of radio-frequency signals with antenna(s) 40 and, if desired, during the reception of radio-frequency signals with antenna(s) 40.

Figure 6:
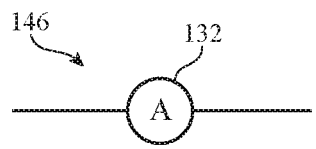
FIG. 6 is a diagram of an illustrative current sensor in accordance with an embodiment.
Figure 7:
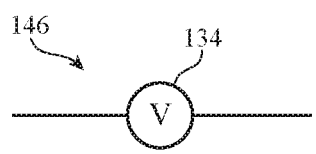
FIG. 7 is a diagram of an illustrative voltage sensor based on a directional coupler in accordance with an embodiment.
Figure 8:
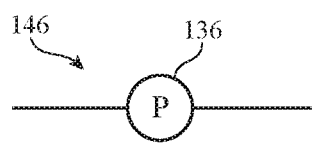
FIG. 8 is a diagram of an illustrative power sensor in accordance with an embodiment.

Illustrative radio-frequency sensors 146 are shown in FIGS. 6, 7, 8, 9, and 10. As shown in FIG. 6, radio-frequency sensor 146 may be formed from a current sensing circuit (current sensor 132) that is interposed within a signal path such as a portion of an antenna, matching circuit, transmission line, or other conductive structure in which radio-frequency antenna signals are present. FIG. 7 shows how sensor 146 may be a radio-frequency voltage sensor that makes voltage measurements using voltage sensor circuit 132. FIG. 8 shows how radio-frequency sensor 146 may be a radio-frequency signal power sensor that makes power measurements using power measurement circuit 136. Sensor circuits such as sensors 132, 134, and 136, may be incorporated into a signal path such as a transmission line, may be incorporated into a portion of a metal path in an antenna (e.g., a portion of a feed, a portion of a return path, a portion of an antenna resonating element arm, a portion of an antenna ground structure, etc.), may be incorporated into a matching circuit (e.g., a circuit that incorporates impedance matching circuitry, tuning circuitry, filter circuitry, etc.), may be incorporated into a signal path in a parasitic antenna element in an antenna (as examples), may be incorporated into a portion of a housing in which induced radio-frequency signals are present during operation, or any other suitable signal path in device 10.

Figure 9:
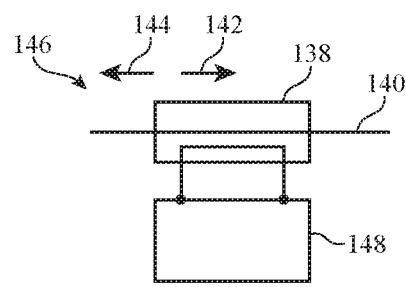
FIG. 9 is a diagram of an illustrative impedance sensor or other sensor that gathers tapped radio-frequency signals using a tap in a signal path in accordance with an embodiment.

If desired, radio-frequency sensors such as illustrative sensor 146 of FIG. 9 may use a signal tap such a tap 138 to make signal measurements. Tap 138 of FIG. 9 may be used to measure radio-frequency signals flowing in signal path 140 without disrupting the signals flowing in path 140 (i.e., tap 138 may extract a small amount of the signals in path 140). Sensor circuit 148 may contain switching circuitry and sensor circuitry to allow signals to be measured in path 140 flowing in direction 142 and 144. Using this type of arrangement, sensor 146 may be used to make current measurements, voltage measurements, power measurements, and/or impedance measurements (e.g., measurements of complex impedance that include both phase and magnitude information, S-parameter measurements, etc.).

Figure 10:
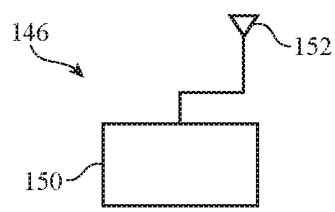
FIG. 10 is a diagram of an illustrative antenna-based radio-frequency signal sensor in accordance with an embodiment.

As shown in FIG. 10, sensor 146 may include a sensor antenna such as sensor antenna 152 and an associated radio-frequency sensor circuit (circuit 150) for measuring wireless signals received via antenna 152 (e.g., currents, voltages, power, complex antenna signals including phase and magnitude information so that S-parameter measurements may be made, etc.), etc.

Sensors such as sensors 146 of FIGS. 6, 7, 8, 9, and 10 and/or other radio-frequency sensors may be embedded within device 10 at ends 20 of housing 12 or elsewhere within device 10. During calibration operations, the output from sensors 146 may be measured while the near-field and/or far-field performance of antenna structures 40 are evaluated in various operating conditions. Following characterizing measurements such as these, calibration data may be stored in the storage of circuitry 30. During operation, the calibration data may be used by circuitry 30 to process sensor signals from sensors 146. The processed sensor signals may reveal information about the wireless operation of device 10 (e.g., total transmitted powers, near-field and/or far-field radiation patterns and powers, information on the current operating environment of device 10, etc.). Device 10 may then take suitable action. For example, transmit powers can be adjusted (e.g., a maximum allows transmit power may be reduced if need to ensure that regulatory limits are satisfied), antennas may be switched into and out of use, phased antenna array adjustments may be make, tunable circuitry may be tuned, etc.

Figure 11:
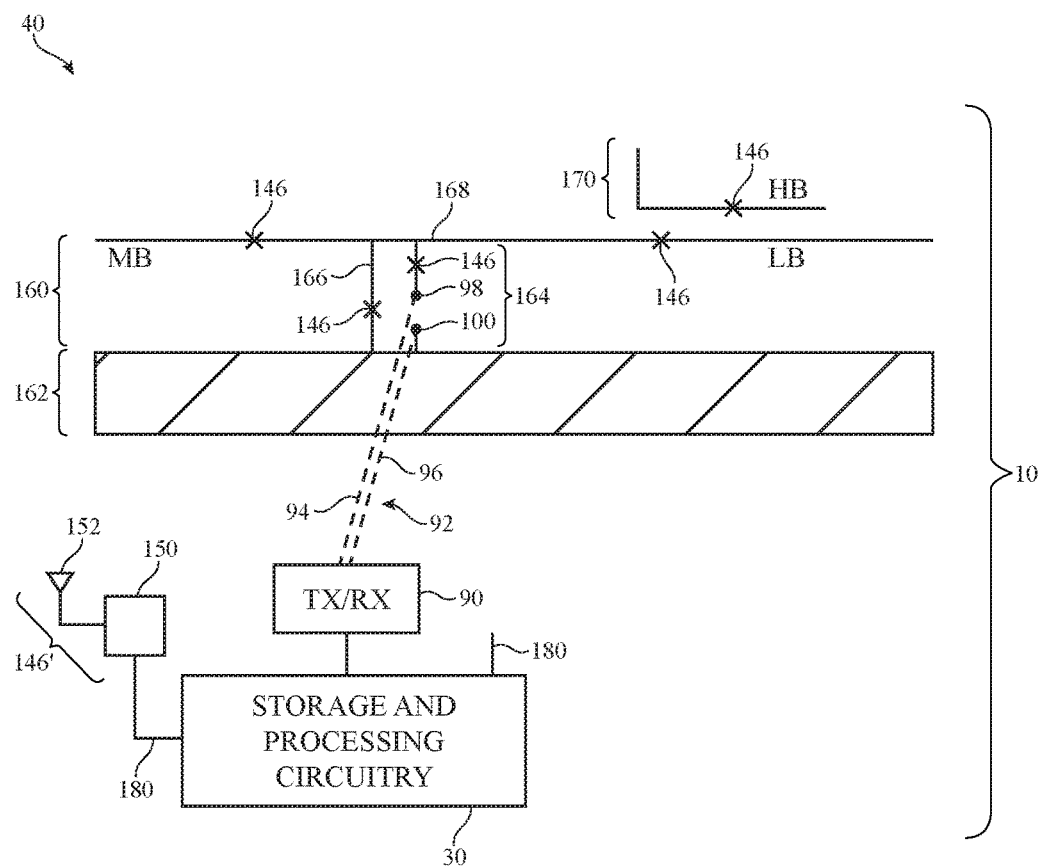
FIG. 11 is a diagram of an illustrative antenna with radio-frequency sensor circuitry in accordance with an embodiment.

Sensors 146 may be incorporated into any suitable structures within device 10. Consider, as an example, the illustrative antenna configuration of device 10 that is shown in FIG. 11. As shown in FIG. 11, transceiver circuitry 90 may be coupled to antenna 40 using transmission line 92. Storage and processing circuitry 30 may be coupled to transceiver 90 and may transmit and receive signals using transceiver 90 and antenna structures such as one or more antennas (e.g., antenna 40 of FIG. 11). As shown in FIG. 11, transmission line 92 may have a positive signal path such as path 94 that is coupled to positive antenna feed terminal 98 and may have a ground signal path such as path 96 that is coupled to ground antenna feed terminal 100.

Antenna 40 may have an antenna resonating element such as inverted-F antenna resonating element 160 and antenna ground 162 (i.e., antenna 40 may be an inverted-F antenna). Antenna resonating element 160 may have a main antenna resonating element arm such as arm 168 and with one or more branches. In the example of FIG. 11, arm 168 has a longer branch such as low band branch LB (e.g., a branch that supports an antenna resonance in a first communications band) and a shorter branch such as midband branch MB that supports an antenna resonance in a second communications band at frequencies greater than those associated with the first communications band). Antenna 40 of FIG. 11 also has parasitic antenna resonating element 170 (e.g., a parasitic antenna resonating element that supports an antenna resonance in a third communications band at frequencies greater than those associated with the first and second communications bands).

Antenna 40 may have a return path such as return path 166 that is coupled between arm 168 and ground 162. Antenna feed 164 may include antenna feed terminals 98 and 100 and may be coupled between arm 168 and ground 162 in parallel with return path 166. Sensors 146 may be located within antenna 40 (e.g., within portions of arm 168, within return path 166, in parasitic element 170, etc.) and may, if desired, include antenna-based sensors such as sensor 146'. Sensor 146' may include a sensor antenna such as antenna 152 and sensor circuitry 150 and may be used in receiving wireless radio-frequency signals that are produced while transceiver circuitry 90 is using antenna 40 to transmit wireless signals. If desired, sensor antenna 152 may be used exclusively for making sensor measurements and not for transmitting wireless communications signals.

Signals from sensors 146 may be conveyed to circuitry 30 using paths 180 and may be used to monitor the operation of wireless circuitry 34 (e.g., antenna(s) 40) in various operating scenarios. To ensure that emitted radiation levels for antenna(s) 40 in device 10 are within regulatory limits, it may be desirable to determine whether device 10 is adjacent to the body of a user (e.g., whether device 10 is adjacent to portions of a user's head, hand, or other body part). The presence of a user's body and other external objects can influence antenna performance (e.g., antennas in device 10 can be blocked and/or loaded by the presence of external objects in the vicinity of the antennas). In situations in which an antenna is being loaded by the presence of an external object, it may be desirable to retune the antenna to ensure satisfactory wireless performance. In situations in which an antenna is being blocked, it may be desirable to switch an unblocked antenna into use in place of the blocked antenna and/or to use beam steering operations to maximize antenna performance. When device 10 is adjacent to a user, beam steering of signals being emitted by a phase antenna array, antenna transmit power limits (for example, reducing the maximum allowed transmit power for antenna(s) 40 regardless of requested power amounts from received wireless transmit power commands from remote base stations), and/or antenna selection operations may be used to ensure that regulatory limits on emitted radiation in the vicinity of a user are satisfied. Control circuitry 30 preferably uses signals from sensors 146 and calibration data that is gathered during device characterization to determine which actions should be taken in operating antennas 40 (tuning, beam steering, antenna selection, maximum transmit power adjustments, etc.).

Figure 12:
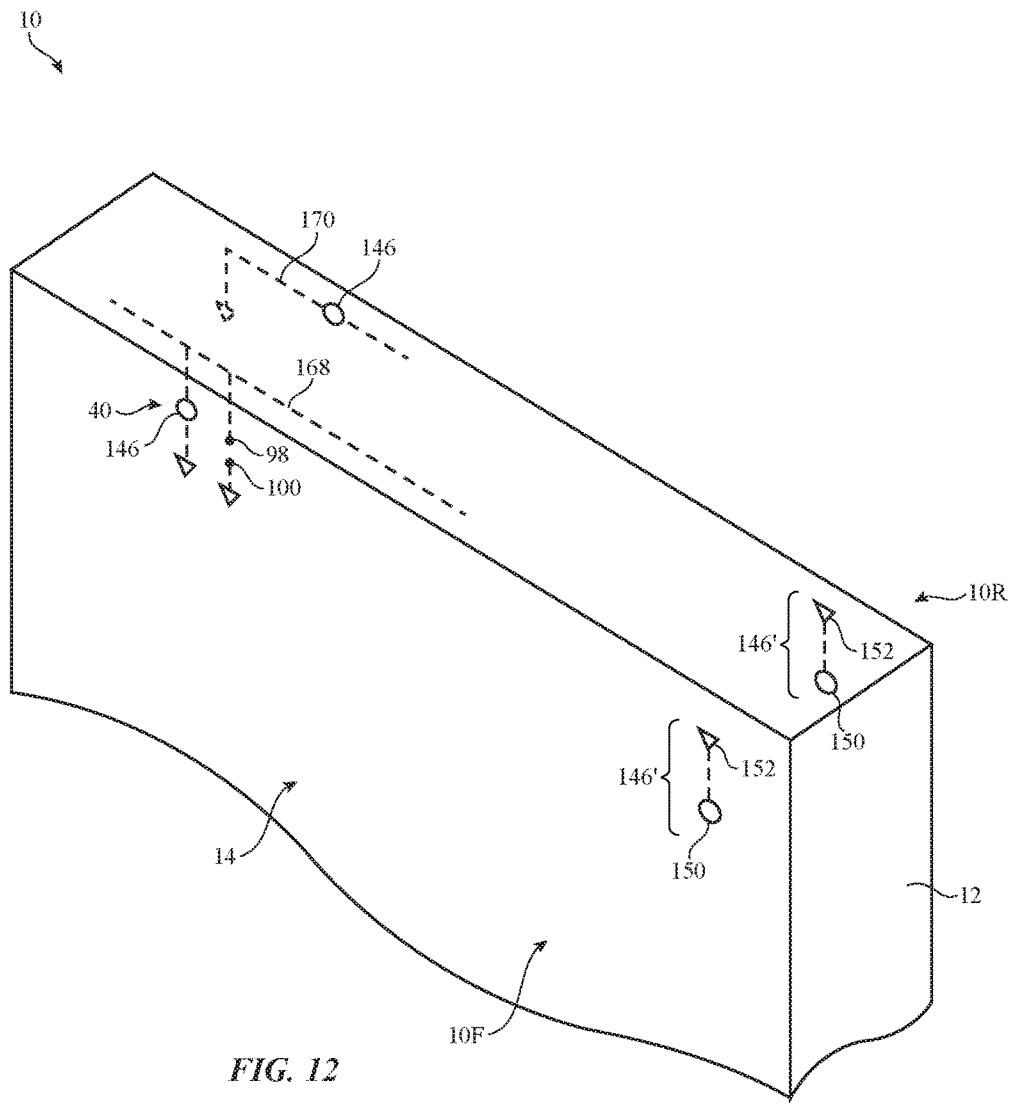
FIG. 12 is a perspective view of an illustrative electronic device with antenna structures and sensors in accordance with an embodiment.

As shown in FIG. 12, device 10 may have a front such as front 10F on which display 14 is mounted and a rear such as rear 10R. The front and rear faces of device 10 of FIG. 12 are planar and rectangular, but other shapes may be used for the surfaces of housing 12 and device 10 if desired. As the example of FIG. 12 illustrates, antenna 40 may be located near to one of the faces of device 10 such as front face 10F and a parasitic element (e.g., a parasitic element that serves as part of antenna 40 and/or as a reflector) may be located near rear face 10R). If desired, parasitic element 170 may be located adjacent to front face 10F and antenna resonating element 160 of antenna 40 may be located near rear face 10R or multiple parasitic elements may be used. The example of FIG. 12 is merely illustrative. Wireless sensors such as sensors 146' that contain sensor circuits 150 and respective sensor antennas 152 may be located near to the front and/or rear faces of device 10. Sensors 146 may be located in antenna 40 (e.g., in return path 166 or elsewhere, as described in connection with FIG. 11), may be located in parasitic antenna resonating element 170 in antenna 40, and/or may be located elsewhere in device 10. In arrangements in which device 10 has multiple antennas 40 (e.g., antennas at the upper and lower ends of device 10), each antenna may be provided with one or more respective sensors 146. Sensors 146 may also be mounted in portions of device 10 that are not directly associated with an antenna at the top or bottom of device 10 (e.g., under a logo in the center of the rear face of device housing 12, along an edge of device 10, on edges or other portions of the front face, and/or on the rear face of housing 12, etc.).

Figure 13:
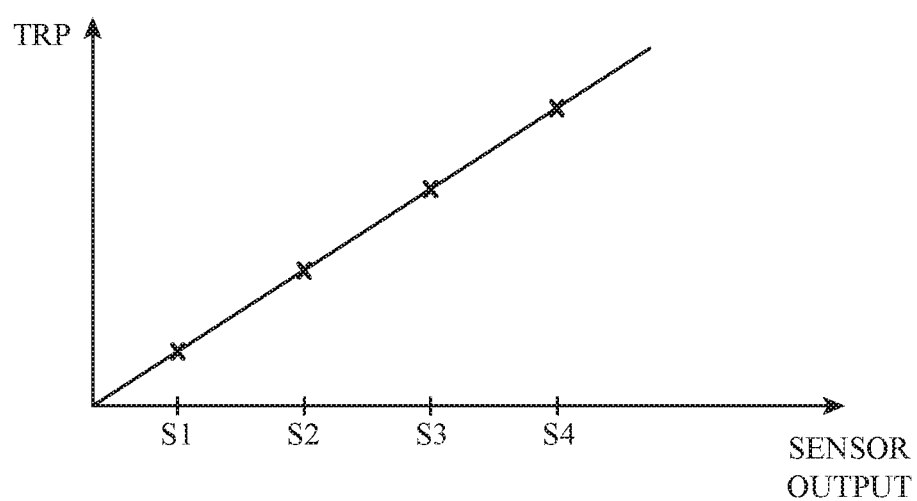
FIG. 13 is a graph in which total radiated power for a wireless device has been correlated with sensor output signals in accordance with an embodiment.

FIG. 13 is a graph showing how antenna operating characteristics such as total radiated power (which may be correlated with specific absorption rate values when device 10 is used by a user) may vary as a function of measured sensor output (see, e.g., sensor output values S1, S2, S3, and S4) from one or more of sensors 146. During calibration measurements, sensor output values may be correlated with antenna operating characteristics (radiated power, direction of radiated power, etc.). For example, it may be determined that the output level from a sensor in the return path of an antenna may scale directly with the amount of total radiated power from the antenna. In this type of scenario, sensor readings may be used to accurately assess total radiated power to ensure that regulatory limits on emitted power are satisfied. Different antennas or parts of antennas may also emit signals in different directions, so sensor readings may be used to help determine the pattern in which signals are emitted.

In some configurations, the ratio of the output of a first sensor to the output of a second sensor may provide information about the operating environment of device 10. For example, the output of sensors 146 may vary as a function of antenna loading due to the presence of nearby external objects. As shown in FIG. 12, device 10 may be provided with some sensors 146 that are closer to front face 10F and some sensors 146 that are closer to rear face 10R. These two different types of sensors may react differently to operating scenarios in which an external object is placed in the vicinity of one of the faces of device 10. For example, the sensor or sensors near front face 10F may exhibit a different change in signal than the sensor or sensors near rear face 10R when device 10 is held against the face of a user. Sensor signals may also reflect changes that are dependent on the type of object adjacent to device 10. The output of sensors 146 may, for example, be different when device 10 is adjacent to a metal object than when device 10 is in free space or when device 10 is adjacent to a dielectric object. Sensor output may therefore be used to determine how device 10 is operating and whether any action should be taken to comply with regulatory limits and/or to enhance communications performance.

As shown in the example of FIG. 14, the ratio of the output from first and second sensors 146 (e.g., sensors located respectively on the front and rear faces of device 10 or elsewhere in device 10) may vary depending on the operating environment of device 10. When the sensor output ratio has value R1, it can be concluded that device 10 is resting on a table. When the sensor output ratio has value R2, it can be concluded that device 10 is adjacent to a user's head. The sensor output ratio will be R3 when device 10 is being held in a user's hand and will be R4 when device 10 is operating in free space. If desired, the relative values of three or more sensors, four or more sensors, or five or more sensors may be used in identifying the current operating environment of device 10. The example of FIG. 2 in which the outputs of a pair of sensors are compared using a ratio of output values is merely illustrative. Moreover, different types of sensor measurements (e.g., impedance amplitude, impedance phase, current measurements, voltage measurements, power measurements, etc.) may be used in characterizing the operating environment of device 10. Aspects of device operation that may be measured using sensor signals from one or more sensors 146 include the current orientation of device 10, the location of external objects relative to device 10, the type of external objects located near device 10 (e.g., human versus inanimate), the total radiated power from the antenna(s) in device 10, the direction of steered radio-frequency beam in a phased antenna array beam steering scenario or the direction-dependent antenna efficiency of one or more antennas 40 that are not in a phased antenna array, antenna detuning effects (e.g., shifts in the resonant frequencies of antennas 40 due to environmental loading, etc.), and other attributes of the wireless operation of device 10. Sensors 146 may be used to make impedance measurements, may be used to make S-parameter measurements (e.g., S21 measurements may be made by transmitting signals through one of antenna 40 while making measurements using a sensor coupled to another antenna 40 or using a sensor circuit coupled to a sensor antenna 152, other S-parameter measurements may be made, etc.), may be used to determine how much current, voltage, or power flow is present at various locations within antennas 40 and/or other portions of the conductive structures of device 10, or may be used to make any other suitable radio-frequency signal measurements during the operation of wireless circuitry 34.

Figure 15:
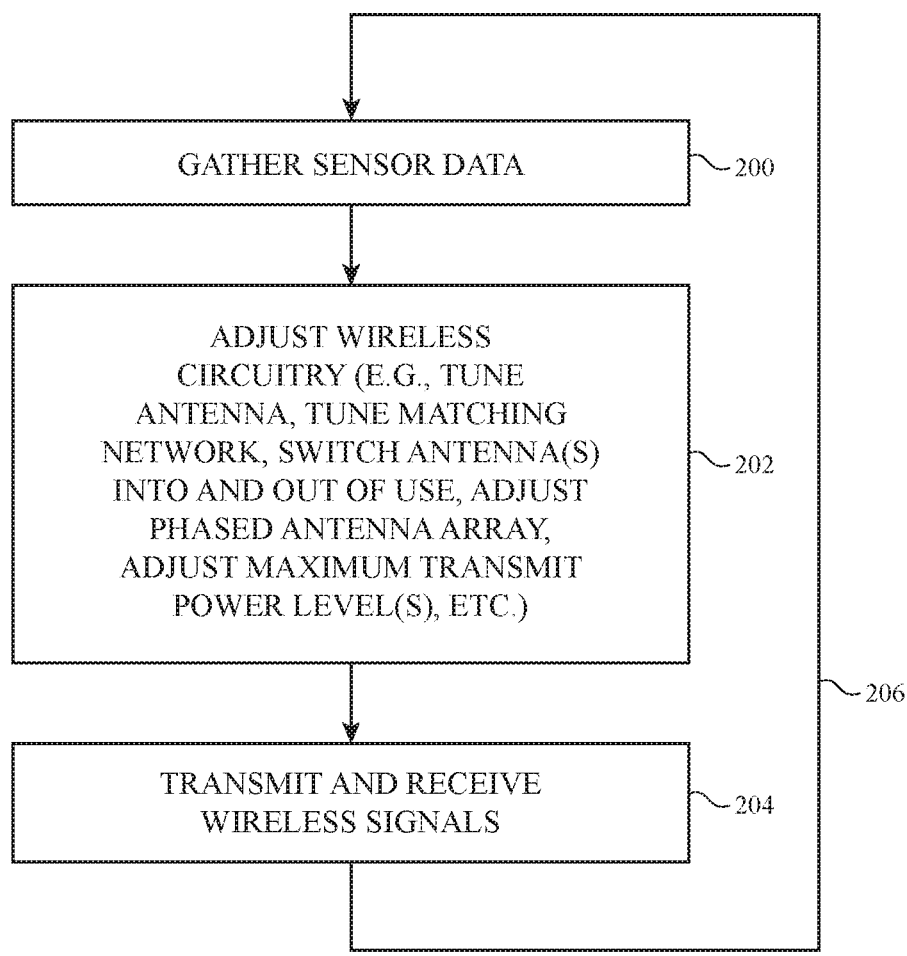
FIG. 15 is a flow chart of illustrative steps involved in operating an electronic device with sensors such as radio-frequency sensors in accordance with an embodiment.

A flow chart of illustrative steps involved in operating device 10 is shown in FIG. 15.

At step 200, while device 10 is using antenna(s) 40 (e.g., while antenna(s) 40 are being used to transmit radio-frequency signals), control circuitry 30 may gather sensor data from one or more radio-frequency sensors 146. Device 10 may also gather data from an accelerometer, magnetic sensor, microphone, capacitive proximity sensor, light-based proximity sensor, and/or other sensors 32 in device 10. Information from the sensors can be used by control circuitry 30 to determine the current operating environment for device 10, to assess the current behavior of antenna(s) 40 and other wireless circuitry 34, and to determine what actions should be taken in response. Calibration data may be used in processing the information from the sensors.

At step 202, in response to determining the current operating environment for device 10 and/or determining how the wireless circuitry of device 10 is operating, control circuitry 30 can take suitable action. For example, if antenna(s) 40 have been detuned due to the presence of an external object, adjustable circuitry (e.g., tunable components 120 in antenna 40 of FIG. 3 and/or tunable components in matching circuit 120) may be adjusted to retune the antenna(s) to cover desired antenna frequencies. If it is determined that one or more of antennas 40 have been blocked, switching circuitry 124 may be adjusted to switch unblocked replacement antennas into use and to switch blocked antennas out of use. Phased antenna array adjustment may be made using adjustable circuitry 126 (e.g., to perform beam steering operations, to reduce radiated power in the direction of a user by placing an emitted power null at the user's location, etc.). If it is determined that a user's head or other body part is adjacent to one or more of antennas 40, the maximum transmit power associated with signals being transmitted through that antenna or set of antennas may be reduced to ensure that regulatory limits on emitted radiation are satisfied even as control circuitry 30 makes power adjustments in response to received transmit power commands (i.e., commands from remote equipment requesting that control circuitry 30 increase or decrease power to maximize performance while minimizing interference).

After taking action in response to the information gathered by the sensors at step 202, device 10 may use transceiver circuitry 90 and one or more antennas 40 to transmit and/or receive wireless signals. As indicated by line 206, the operations of steps 200, 202, and 204 may be performed continuously while a user is using device 10.

The foregoing is merely illustrative and various modifications can be made by those skilled in the art without departing from the scope and spirit of the described embodiments. The foregoing embodiments may be implemented individually or in any combination.

What is claimed is:

1. An electronic device, comprising:
   a housing;
   control circuitry in the housing;
   radio-frequency transceiver circuitry coupled to the control circuitry;
   antennas coupled to the radio-frequency transceiver circuitry; and
   a plurality of radio-frequency sensors including at least a first sensor that produces a first sensor output and a second sensor that produces a second sensor output that are coupled to the control circuitry and that measure radio-frequency signals produced when the radio-frequency transceiver circuitry uses at least one of the antennas to transmit wireless radio-frequency signals, wherein the control circuitry is configured to control the transmission of the wireless radio-frequency signals with the transceiver circuitry based at least partly on a ratio between the first sensor output and the second sensor output.

2. The electronic device defined in claim 1 further comprising switching circuitry coupled between the antennas and the radio-frequency transceiver circuitry, wherein the control circuitry adjusts the switching circuitry to switch at least one of the antennas into use and at least one other of the antennas out of use in response to the measured radio-frequency signals.

3. The electronic device defined in claim 2 wherein the antennas include at least one inverted-F antenna having a return path and wherein the plurality of radio-frequency sensors includes at least one radio-frequency sensor that measures signals in the return path and wherein the control circuitry is configured to adjust wireless transmit power levels associated with the radio-frequency transceiver circuitry at least partly based on the measured radio-frequency signals.

4. The electronic device defined in claim 1 wherein the antennas include at least one inverted-F antenna having a return path and wherein the plurality of radio-frequency sensors includes at least one radio-frequency sensor that measures signals in the return path.

5. The electronic device defined in claim 4 further comprising a tunable component in at least one of the antennas, wherein the control circuitry is configured to adjust the tunable component in response to the signals measured in the return path.

6. The electronic device defined in claim 1 wherein the control circuitry is configured to adjust a maximum transmit power level at which the radio-frequency transceiver circuitry transmits signals through the antennas in response to the measured radio-frequency signals.

7. The electronic device defined in claim 1 wherein the antennas are arranged in a phased antenna array and wherein the control circuitry is configured to adjust the phased antenna array in response to the measured radio-frequency signals.

8. An electronic device, comprising:
control circuitry;
radio-frequency transceiver circuitry coupled to the control circuitry;
antennas coupled to the radio-frequency transceiver circuitry that transmit wireless radio-frequency signals;
radio-frequency sensors including at least a first sensor that produces a first sensor output and a second sensor that produces a second sensor output that are coupled to the control circuitry and that measure; and
switching circuitry coupled between the antennas and the radio-frequency transceiver circuitry that switches one of the antennas into use and at least one other of the antennas out of use based partly on a ratio between the first sensor output and the second sensor output.

9. The electronic device defined in claim 8 wherein the control circuitry determines a current operating environment of the electronic device and wherein the switching circuitry switches one of the antennas into use and one other of the antennas out of use based partly on the current operating environment.

10. The electronic device defined in claim 9 wherein the control circuitry determines the current operating environment based on a type of object adjacent to the electronic device.

* * * * *